US011064209B2

(12) United States Patent
Fu et al.

(10) Patent No.: US 11,064,209 B2
(45) Date of Patent: *Jul. 13, 2021

(54) SYSTEM AND METHOD FOR CONTENT ADAPTIVE CLIPPING

(71) Applicant: MediaTek Inc., Hsin-Chu (TW)

(72) Inventors: Chih-Ming Fu, Hsinchu (TW);
Ching-Yeh Chen, Taipei (TW);
Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,953

(22) Filed: May 6, 2019

(65) Prior Publication Data
US 2019/0261008 A1 Aug. 22, 2019

Related U.S. Application Data
(63) Continuation of application No. 15/238,415, filed on Aug. 16, 2016, now Pat. No. 10,291,921, which is a
(Continued)

(51) Int. Cl.
*H04N 19/182* (2014.01)
*H04N 19/70* (2014.01)
(Continued)

(52) U.S. Cl.
CPC .......... *H04N 19/182* (2014.11); *H04N 5/21* (2013.01); *H04N 5/2173* (2013.01);
(Continued)

(58) Field of Classification Search
CPC .......... G06K 9/46; G06F 17/30017; G06F 17/30716; H04N 19/14; H04N 19/186;
(Continued)

(56) References Cited
U.S. PATENT DOCUMENTS 5,229,864 A 7/1993 Moronaga et al.
8,615,141 B2 * 12/2013 Poon .............. G06T 5/003
375/240.13
(Continued)

OTHER PUBLICATIONS

McCann, et al.; "Samsung's Response to the Call for Proposals on Video Compression Technology;" Document: JCTVC-A124, Joint Collaborative Team on Video Coding (JCT-VC) of ITU-T SG16 WP3 and ISO/IEC JTC1/SC29/WG11, 1st Meeting: Dresden, DE; Apr. 15-23, 2010.
(Continued)

*Primary Examiner* — Nathnael Aynalem
(74) *Attorney, Agent, or Firm* — McClure, Qualey & Rodack, LLP

(57) ABSTRACT

A system and method of content adaptive pixel intensity processing are described. The method includes receiving a predefined set of processed video data configured from the processed video data, deriving a range information associated with an original maximum value and an original minimum value for a predefined set of original video data, wherein the predefined set of processed video data is derived from the predefined set of original video data, and adaptively clipping pixel intensity of the predefined set of processed video data to a range deriving from the range information, wherein the range information is incorporated in a bitstream and represented in a form of the original maximum value and the original minimum value, prediction values associated with a reference maximum value and a reference minimum value, or a range index associated with a predefined range set.

15 Claims, 10 Drawing Sheets

Related U.S. Application Data continuation of application No. 12/954,844, filed on Nov. 26, 2010, now Pat. No. 9,456,111.

(60) Provisional application No. 61/377,736, filed on Aug. 27, 2010, provisional application No. 61/354,789, filed on Jun. 15, 2010.

(51) Int. Cl.

| | |
|---|---|
| *H04N 19/46* | (2014.01) |
| *H04N 19/61* | (2014.01) |
| *H04N 19/14* | (2014.01) |
| *H04N 19/82* | (2014.01) |
| *H04N 19/86* | (2014.01) |
| *H04N 19/186* | (2014.01) |
| *H04N 19/44* | (2014.01) |
| *H04N 19/625* | (2014.01) |
| *H04N 19/91* | (2014.01) |
| *H04N 5/217* | (2011.01) |
| *H04N 5/21* | (2006.01) |

(52) U.S. Cl.
CPC ........... *H04N 19/14* (2014.11); *H04N 19/186* (2014.11); *H04N 19/44* (2014.11); *H04N 19/46* (2014.11); *H04N 19/61* (2014.11); *H04N 19/625* (2014.11); *H04N 19/70* (2014.11); *H04N 19/82* (2014.11); *H04N 19/86* (2014.11); *H04N 19/91* (2014.11)

(58) Field of Classification Search
CPC ........ H04N 19/82; H04N 19/86; H04N 19/10; H04N 19/115; H04N 19/117; H04N 19/129; H04N 19/134; H04N 19/137; H04N 19/154; H04N 19/157; H04N 19/159; H04N 19/174; H04N 19/176; H04N 19/196; H04N 19/439; H04N 19/463; H04N 19/96; H04N 19/182; H04N 19/44; H04N 19/46; H04N 19/61; H04N 19/625; H04N 19/70; H04N 19/91; H04N 5/21; H04N 5/2173
USPC ....................................... 375/240.11, 240, 29
See application file for complete search history.

(56) References Cited

U.S. PATENT DOCUMENTS

| | | | |
|---|---|---|---|
| 8,995,767 B2* | 3/2015 | Graham | G06F 16/40 382/176 |
| 2002/0001416 A1 | 1/2002 | Zhou et al. | |
| 2003/0174776 A1* | 9/2003 | Shimizu | H04N 19/51 375/240.16 |
| 2003/0194013 A1 | 10/2003 | Alvarez | |
| 2003/0222991 A1 | 12/2003 | Muammar et al. | |
| 2004/0012675 A1* | 1/2004 | Caviedes | H04N 19/14 348/180 |
| 2005/0152452 A1 | 7/2005 | Suzuki | |
| 2005/0243931 A1* | 11/2005 | Yasuda | H04N 19/577 375/240.16 |
| 2006/0088107 A1* | 4/2006 | Cancemi | H04N 21/4344 375/240.27 |
| 2007/0177671 A1 | 8/2007 | Yang | |
| 2009/0220011 A1* | 9/2009 | Kursawe | H04N 21/64315 375/240.25 |
| 2010/0160049 A1 | 6/2010 | Oku | |
| 2010/0189177 A1* | 7/2010 | Shimizu | H04N 19/105 375/240.12 |
| 2010/0215102 A1 | 8/2010 | Takamura et al. | |
| 2011/0115981 A1 | 5/2011 | Matsumoto | |
| 2011/0194614 A1 | 8/2011 | Norkin et al. | |

OTHER PUBLICATIONS

Huang, Y.W., et al.; "In-Loop Adaptive Restoration;" Document: JCTVC-B077, Joint Collaborative Team on Video Coding (JCT-VC) of ITU-T SG16 WP3 and ISO/IEC JTC1/SC291WG11, 2nd Meeting: Geneva, CH, Jul. 21-28, 2010.

\* cited by examiner

| pic_parameter_set_rbsp( ) { | C | Descriptor |
|---|---|---|
| ... | | |
| adaptive_clipping_flag | 1 | u(1) |
| if( adaptive_clipping_flag ) | | |
| { | | |
|   adaptive_clipping_slice_level_flag | 1 | u(1) |
|   adaptive_clipping_broadcast_legal_flag | 1 | u(1) |
|   if( !adaptive_clipping_broadcast_legal_flag ) | | |
|   { | | |
|     adaptive_clipping_sameUV_data_flag | 1 | u(1) |
|     adaptive_clipping_minY | 1 | ue(v) |
|     adaptive_clipping_limitY_minus_maxY | 1 | ue(v) |
|     adaptive_clipping_minU | 1 | ue(v) |
|     adaptive_clipping_limitU_minus_maxU | 1 | ue(v) |
|     if( adaptive_clipping_sameUV_data_flag ) | | |
|     { | | |
|       adaptive_clipping_minV = adaptive_clipping_minU | | |
|       adaptive_clipping_maxV = adaptive_clipping_maxU | | |
|     } else { | | |
|       adaptive_clipping_minV | 1 | ue(v) |
|       adaptive_clipping_limitV_minus_maxV | 1 | ue(v) |
|     } | | |
|   } | | |
| } | | |
| ... | | |
| } | | |

*Fig. 6*

| slice_header( ) { | C | Descriptor |
|---|---|---|
|   adaptive_clipping_use_slice_delta_flag | 1 | u(1) |
|   if( adaptive_clipping_slice_level_flag && <br>    adaptive_clipping_use_slice_delta_flag ) | | |
|   { | | |
|     adaptive_clipping_minY_slice_delta | 2 | se(v) |
|     adaptive_clipping_maxY_slice_delta | 2 | se(v) |
|     adaptive_clipping_minU_slice_delta | 2 | se(v) |
|     adaptive_clipping_maxU_slice_delta | 2 | se(v) |
|     if( adaptive_clipping_sameUV_data_flag ) | | |
|     { | | |
|       adaptive_clipping_minV_slice = adaptive_clipping_minU_slice | | |
|       adaptive_clipping_maxV_slice = adaptive_clipping_maxU_slice | | |
|     } else { | | |
|       adaptive_clipping_minV_slice_delta | 2 | se(v) |
|       adaptive_clipping_maxV_slice_delta | 2 | se(v) |
|     } | | |
|   } | | |
|   ... | | |
| } | | |

*Fig. 7*

SYSTEM AND METHOD FOR CONTENT ADAPTIVE CLIPPING

CROSS REFERENCE TO RELATED APPLICATIONS

The present invention is a Continuation of pending U.S. patent application Ser. No. 15/238,415, filed on Aug. 16, 2016, which is a Continuation of U.S. patent application Ser. No. 12/954,844, filed on Nov. 26, 2010 (now U.S. Pat. No. 9,456,111, issued on Sep. 27, 2016), which claims priority to U.S. Provisional Patent Application, No. 61/354,789, filed Jun. 15, 2010, entitled "Adaptive Restoration Method in Video Coding", and U.S. Provisional Patent Application, No. 61/377,736, filed Aug. 27, 2010, entitled "Adaptive Clipping Method for Video Coding". The U.S. Provisional Patent Applications are hereby incorporated by reference in their entireties.

FIELD OF THE INVENTION

The present invention relates to video processing. In particular, the present invention relates to system and method for content adaptive clipping.

BACKGROUND

Video data in a digital format offers many advantages over the conventional analog format and has become the dominant format for video storage and transmission. The video data is usually digitized into an integer represented by a fixed number of bits, such as 8 bits or 10 bits per sample. Furthermore, color video data is often represented using a selected color system such as a Red-Green-Blue (RGB) primary color coordinates or a luminance-chrominance system. A popularly used luminance-chrominance color system used in digital video is the well-known YCrCb color system, where Y is referred to as the luminance component and Cr and Cb are referred to as the chrominance signals. The RGB components and the Y component are associated with the intensity of the primary colors and the luminance respectively, and their digital representation is often mapped to an integer having a range associated with the number of bits of the digital representation. For example, an 8-bit video data usually represents an intensity level 0 to 255. On the other hand, the chrominance components, Cr and Cb, correspond to difference data and their digital representation is often mapped to an integer having negative and positive values. For example, an 8-bit Cr/Cb data represents a chrominance level from −128 to +127.

Along the processing path in a digital video system, the processed video data may exceed the original range of digital representation or the mean value of the processed video may be shifted. For example, various digital filters may be applied to digital video data for different purposes such as noise suppression, edge sharpening, block boundary smoothing, anti-aliasing, and etc. Particular coefficients selected for the filter will affect the intensity range of the processed video data and cause unexpected artifact if the out of range data is not properly addressed. Data overflow and underflow is a symptom that often occurs when the out of range data is not taken care of properly, where an extremely bright pixel may become a dark pixel and vice versa. In some cases, the mean intensity level of processed video data may also be shifted. The intensity shifting may be caused by filtering, data rounding, quantization or other processing. Intensity shift, also called intensity offset, may cause visual impairment or artifacts, which is especially noticeable when the intensity shift varies from frame to frame. Therefore, the pixel intensity has to be carefully clipped or offset corrected to avoid the potential problems mentioned above.

However, picture contents often are very dynamic between frames and within a frame and change from time to time. In order to explore the advantage of content adaptive pixel processing in a dynamic video environment, it is desirable to develop a system and method that can select a picture unit, termed predefined set, for the underlying video data to further improve the quality of processed video data. The predefined set can be selected to capture the dynamic characteristics of the underlying video data.

BRIEF SUMMARY OF THE INVENTION

A system and method for content-adaptive pixel-intensity clipping are disclosed. A method according to embodiments of the invention performs content adaptive clipping of processed video data. The method receives a predefined set of processed video data configured from the processed video data, and derives a range information associated with an original maximum value and an original minimum value for a predefined set of original video data, wherein the predefined set of processed video data is derived from the predefined set of original video data. The method further adaptively clips pixel intensity of the predefined set of processed video data to a range deriving from the range information, wherein the range information is incorporated in a bitstream and represented in a form of the original maximum value and the original minimum value, prediction values associated with a reference maximum value and a reference minimum value, or a range index associated with a predefined range set.

An integrated video decoder circuit, according to embodiments of the invention, has content adaptive clipping. The integrated video decoder circuit includes an entropy decoder to receive a bitstream and to provide coded symbols and a data processing unit to recover prediction error from the coded symbols. The circuit further includes a reconstruction unit to provide a reconstructed image based on the prediction error and a previously decoded image, and a content adaptive clipping circuit to clip reconstructed video data corresponding to the reconstructed image. Further still, the circuit includes a frame buffer to store the reconstructed video data clipped by the content adaptive clipping circuit and to provide next previously decoded image. In operation, the content adaptive clipping circuit comprises: an interface circuit to receive a predefined set of reconstructed video data configured from the reconstructed video data, a range determination circuit to derive a range information associated with an original maximum value and an original minimum value for a predefined set of original video data, wherein the predefined set of reconstructed video data is derived from the predefined set of original video data, and a clipping circuit to adaptively clip pixel intensity of the predefined set of reconstructed video data to a range deriving from the range information, wherein the range information is derived from the bitstream and represented in a form of the original maximum value and the original minimum value, prediction values associated with a reference maximum value and a reference minimum value, or a range index associated with a predefined range set.

In accordance with other embodiments, an integrated video encoder circuit, having content adaptive clipping, comprises a prediction unit to provide prediction error based on an input image and a prediction image, a first data processing unit to convert the prediction error into coded symbols, and an entropy encoder to provide a compressed bitstream for the coded symbols. The circuit further comprises a second data processing unit to recover reconstructed prediction error from the coded symbols, a reconstruction unit to provide a reconstructed image based on the reconstructed prediction error and a previously decoded image, a content adaptive clipping circuit to clip reconstructed video data corresponding to the reconstructed image, and a frame buffer to store the reconstructed video data clipped by the content adaptive clipping circuit and to provide next previously decoded image. Further, the content adaptive clipping circuit comprises: an interface circuit to receive a predefined set of reconstructed video data configured from the reconstructed video data, a range determination circuit to derive a range information associated with an original maximum value and an original minimum value for a predefined set of original video data, wherein the predefined set of original video data corresponds to the input image and the predefined set of reconstructed video data is derived from the predefined set of original video data, and a clipping circuit to adaptively clip pixel intensity of the predefined set of reconstructed video data to a range deriving from the range information, wherein the range information is incorporated in the compressed bitstream and represented in a form of the original maximum value and the original minimum value, prediction values associated with a reference maximum value and a reference minimum value, or a range index associated with a predefined range set.

BRIEF DESCRIPTION OF THE DRAWINGS

FIG. 6 illustrates an exemplary syntax for providing the range information associated with pixel intensity clipping, where the range information is included in the Picture Parameter Set (PPS).

FIG. 7 illustrates an exemplary syntax for providing the range information associated with pixel intensity clipping, where the range information is included in the slice header.

DETAILED DESCRIPTION OF THE INVENTION

Video data is usually digitized into digital samples represented by a fixed number of bits, such as 8 bits or 10 bits per sample. For color video data, it is often represented in a selected color system such as a Red-Green-Blue (RGB) primary color coordinates or a luminance-chrominance system such as YCrCb color coordinates, where Y is referred to as the luminance component and Cr and Cb are referred to as the chrominance signals. The RGB components and the Y component are associated with the intensity of the primary colors and the luminance respectively, and their intensity is usually represented digitally in finite resolution corresponding to a non-negative integer. For example, an 8-bit data represents intensity level from 0 to 255. On the other hand, the chrominance components, Cr and Cb, are derived as a type of difference data and an 8-bit Cr/Cb data represents an integer corresponding to a level from −128 to +127.

Figure 1:
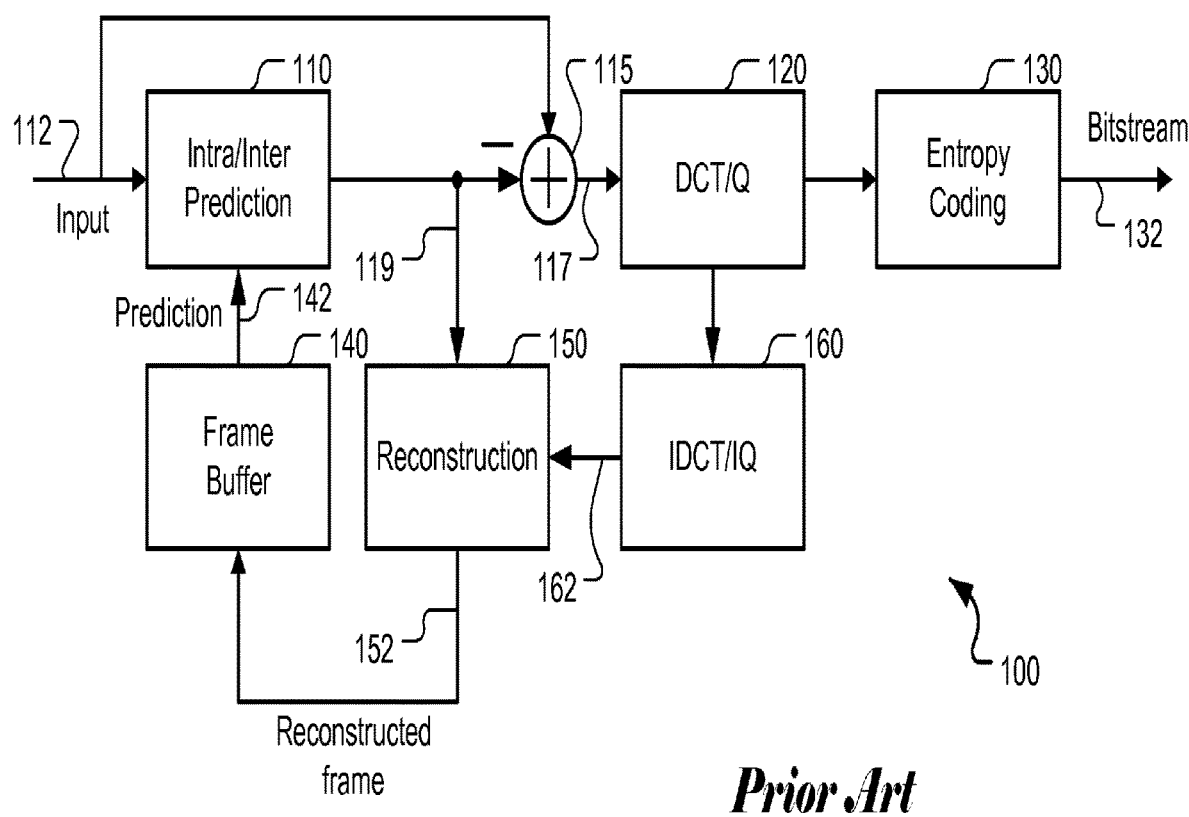
FIG. 1 illustrates a system block diagram of conventional video compression with intra/inter-prediction.

In a digital video processing system, the video data is subject to various mathematical operations which may inadvertently extend the processed video data beyond the range of the original digital representation. If the processed data exceeds the original range, the data has to be properly clipped to avoid possible data inversion, such as a high intensity value exceeding the range may be inadvertently treated as a low intensity value if only the lowest eight bits are retained. Furthermore, some mathematical operations may cause the data range to shift. If the shift, also called offset, is not correctly restored, the processed video data may show some impairment or artifacts. The above mentioned pixel intensity issues may occur in a video compression system as shown in FIG. 1. Compression system 100 illustrates a typical video encoder utilizing intra/inter-prediction, Discrete Cosine Transform (DCT) and entropy coding. The original video data enters the encoder through input interface 112 and the input video data is subject to intra/inter-prediction 110. In the intra prediction mode, the incoming video data is predicted by surrounding data in the same frame or field that are already coded, and the prediction data 142 from frame buffer 140 correspond to surrounding data in the same frame or field that are already coded. The prediction may also be made within a unit corresponding to a part of picture smaller than a frame or a field, such as a stripe or slice for better error isolation. In the inter prediction mode, the prediction is based on previously reconstructed data 142 stored in frame buffer 140. The inter prediction can be a forward prediction mode, where the prediction is based on a picture prior to the current picture. The inter prediction may also be a backward prediction mode where the inter prediction is based on a picture after the current picture. In the inter-prediction mode, the intra/inter prediction 110 will cause the prediction data to be provided to the adder 115 and be subtracted from the original video data. The output 117 from adder 115 is termed the prediction error which is further processed by DCT/Q block 120 representing Discrete Cosine Transform and quantization (Q). DCT/Q block 120 converts prediction errors 117 into coded symbols for further processing by entropy coding 130 to produce compressed bitstream 132, which is stored or transmitted. In order to provide the prediction data, the prediction error processed by DCT/Q block 120 has to be recovered by inverse DCT and inverse quantization (IDCT/IQ) 160 to provide a reconstructed prediction error 162. In the reconstruction block 150, the reconstructed prediction error 162 is added to a previously reconstructed frame 119 in the inter prediction mode stored in frame buffer 140 to form a currently reconstructed frame 152. In the intra prediction mode, the reconstructed prediction error 162 is added to the previously reconstructed surrounding data in the same frame stored in frame buffer 140 to form the currently reconstructed frame 152. Intra/inter prediction block 110 is configured to route the reconstructed data 119 stored in frame buffer 140 to reconstruction block 150, where the reconstructed data 119 may correspond to reconstructed previous frame or reconstructed surrounding data in the same frame depending on the inter/intra mode. In advanced video compression systems, reconstruction block 150 not only reconstruct a frame based on the reconstructed prediction error 162 and previously reconstructed data 119, it may also perform certain processing such as deblocking and loop filtering to reduce coding artifacts at block boundaries. Due to various mathematical operations associated with DCT, quantization, inverse quantization, inverse DCT, deblocking processing and loop filtering, the pixels of the reconstructed frame may have intensity level changed beyond the original range and/or the intensity level may have a mean level shifted. Therefore, the pixel intensity has to be properly processed to alleviate or eliminate the potential problem.

Figure 2:
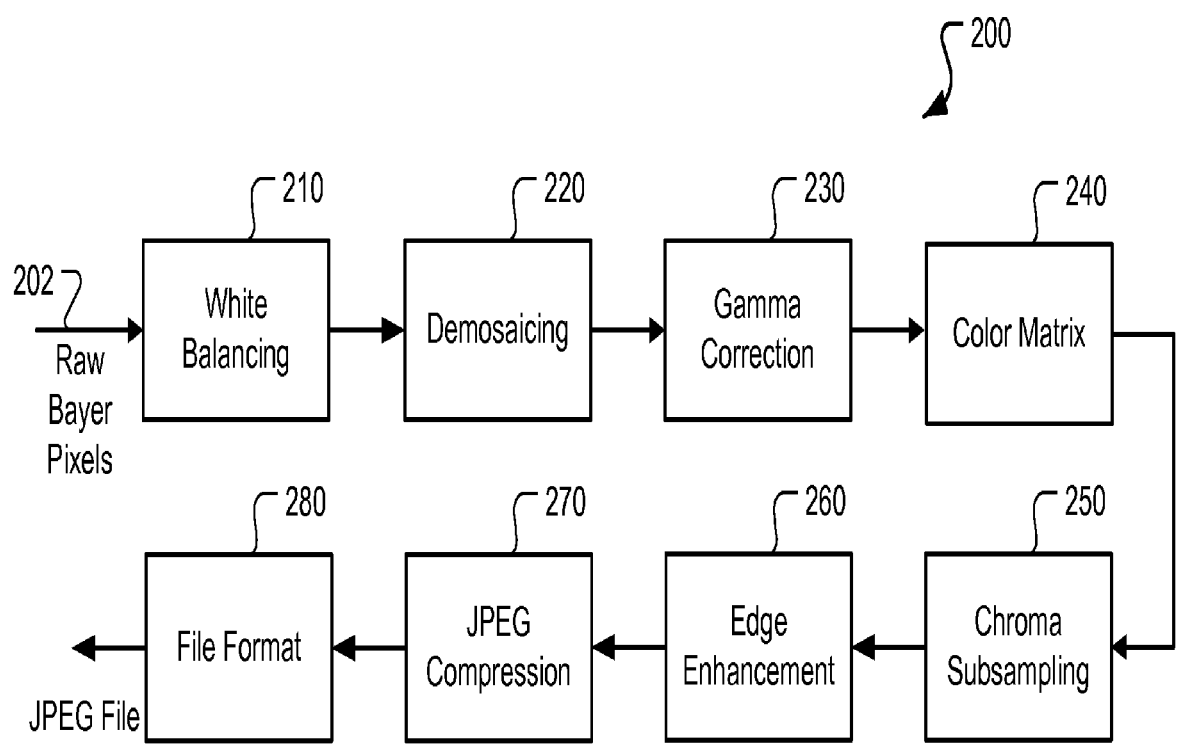
FIG. 2 illustrates an exemplary system block diagram of signal processing in a digital camera.

While FIG. 1 illustrates a popular video compression system that required pixel intensity processing to overcome out-of-range data and offset problems, there are many other widely used systems encountering the same problems, such as digital camera. A simplified system block diagram for image/video processing in a digital camera 200 is shown in FIG. 2 where the system is configured for still picture capture. Most modern digital cameras also support video capture where consecutive frames from the image sensor may be captured using motion JPEG compression or using video compression shown in FIG. 1. The incoming video data 202 is typically in a raw RGB Bayer pattern where one of the line pair consists of RG pixels and the other consists of GB pixels. White balancing 210 is applied to the raw color pixels to adjust color shift due to lighting condition and color temperature of lighting sources. The Bayer pattern raw data only contains a single color (R, G or B) at each pixel location. In order to create missing color pixels at each pixel location, a technique called demosaicing 220 or Color Filter Array (CFA) interpolation is used. Gamma correction 230 is then applied to adjust pixel intensity to pre-compensate the power-function characteristic of a display device. Color matrix 240 converts the RGB color to YCrCb color to take advantage of more efficient color representation. The resolution of Cr and Cb components are subsequently reduced by chroma subsampling 250. Since low-pass filtering may be used in the chain of processing, such as demosaicing 220, edge enhancement 260 is often used to artificially sharpen the image. While sharpening may cause the image appear to be sharper, it may result in higher data rate for the subsequent compression. Therefore, the edge enhancement parameters usually are made to be adjustable. While FIG. 2 illustrates the JPEG compression 270 is applied for still image application, video compression such as MPEG-4 or H.264 may also be used to compress the video sequence. The compressed image or video is then processed by file format module 280 to pack the compressed data into a particular file format, such as JPG for still picture or .MP4 for MPEG-4 compressed video data. In the signal processing chain shown in FIG. 2, the processed data may encounter out-of-range and offset problems as well. For example, demosaicing 220 and edge enhancement 260 may involve fairly complicated filters which may result in out-of-range and offset problems and the processed video data may require pixel intensity clipping and/or offset restoration to correct possible problems.

Figure 3:
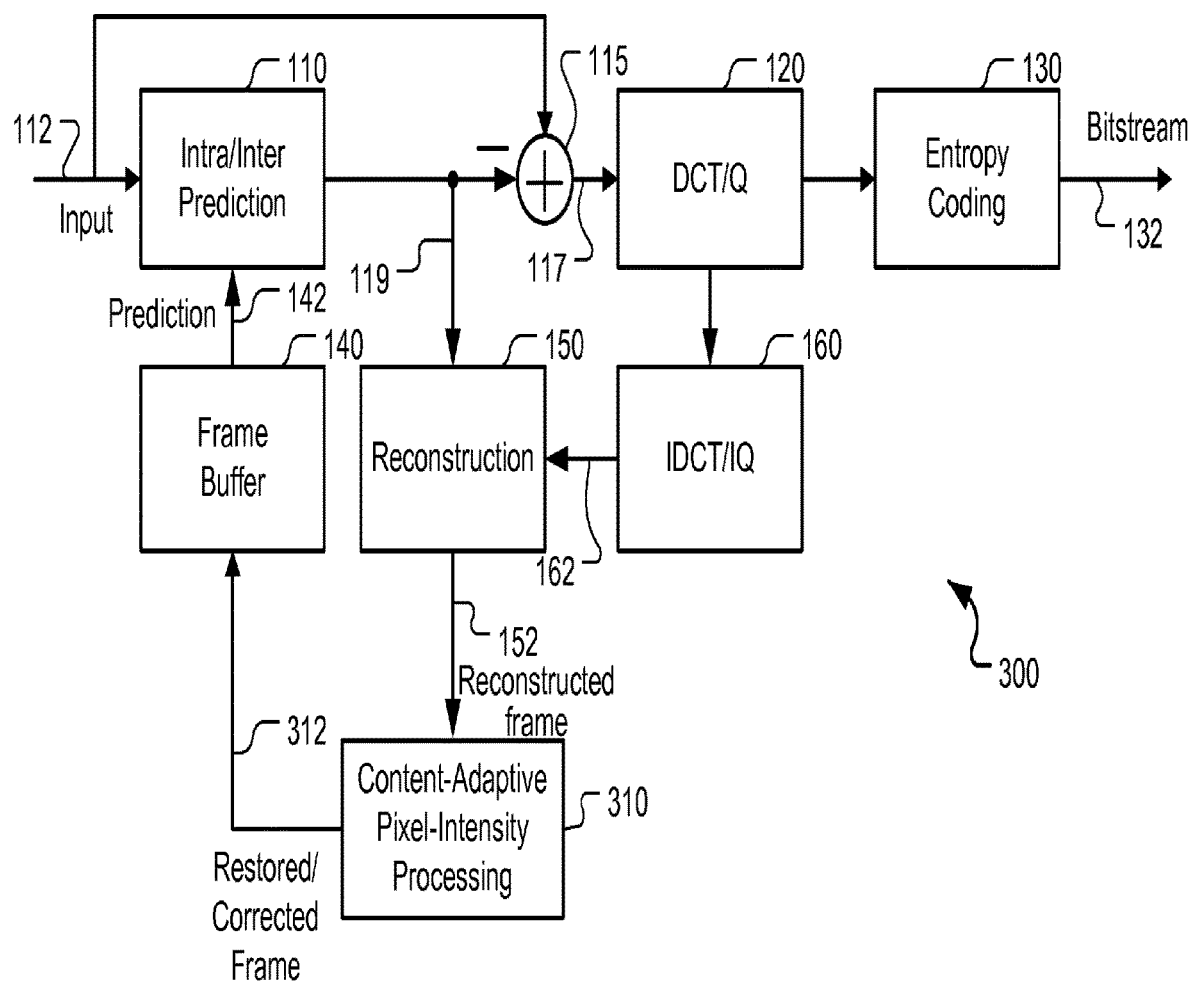
FIG. 3 illustrates the system block diagram having content-adaptive pixel intensity processing to correct intensity problems for video compression with intra/inter-prediction.

In the video compression system as shown in FIG. 1, the out-of-range and offset problems in the reconstructed video as described above can be corrected by incorporating a content-adaptive pixel-intensity processing module 310 in the compression system 300 as shown in FIG. 3. In FIG. 3, the content-adaptive pixel-intensity processing 310 receives input video data 152 from the reconstruction block 150. While the content-adaptive pixel-intensity processing 310 is shown as a processing block separate from the reconstruction block 150, some steps or procedures of the content-adaptive pixel-intensity processing 310 may be interleaved or combined with steps or procedures of the reconstruction block 150. For example, both deblocking and loop filter are considered as part of processing for reconstruction. The content-adaptive pixel-intensity processing 310 or part of the processing disclosed herein may be applied to video data between the deblocking and loop filter. It is understood that FIG. 3 is meant for illustrating an example regarding where the content-adaptive pixel-intensity processing 310 can be used in a video compression system. It does not necessarily imply that the content-adaptive pixel-intensity processing 310 has to be separable from the reconstruction block 150. Similarly, the content-adaptive pixel-intensity processing 310 may also be applied to processed video data in a sensor image processing system of FIG. 2. For example, the content-adaptive pixel-intensity processing 310 may be applied to processed video data from demosaicing 220 or edge enhancement 260. The content-adaptive pixel-intensity processing 310 provides restored/corrected frame data to the frame buffer. In the present disclosure, the restoration and correction are used interchangeably. Similarly, "restore" and "correct" are also used interchangeably.

Figure 4A:
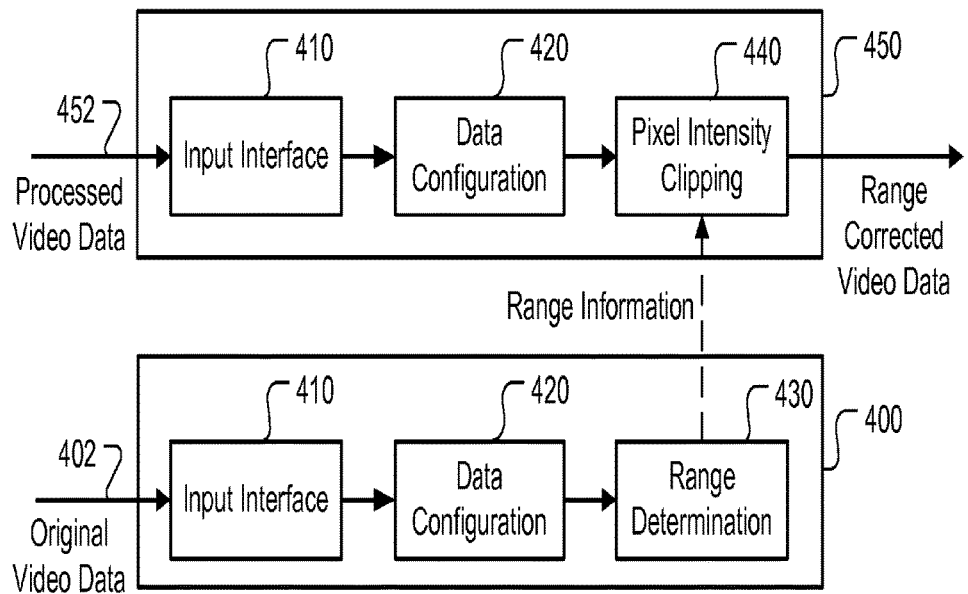
FIG. 4A illustrates an exemplary system block diagram of content-adaptive clipping for a predefined set of video data.

The present invention explores the dynamic characteristics in video data by processing video data in a unit having a size predefined. The unit having a size predefined is termed "a predefined set". A predefined set can be a partial picture such as a macroblock, a group of macroblocks, a slice, a stripe, a picture region, a field, a frame, or a group of pictures. The predefine set can be fixed for the whole video data or can be varied adaptively according to a performance criterion. The performance criterion can be an index for image quality or channel quality such as Peak Sign-to-Noise ratio (PSNR). FIG. 4A illustrates an exemplary system block diagram for content-adaptive clipping of a predefined set of processed video data according to the present invention. Processing module 450 corresponds to clipping processing applied to the processed video data 452 which is likely to subject to the out-of-range problem and needs to be corrected. Input interface 410 receives the processed video data. In typical hardware implementation, the processed video data may be stored in memory such as Dynamic Random Access Memory (DRAM). Input interface 410 may be implemented as a part of memory controller which can be configured to access the processed video data 452. Data configuration 420 is used to configure the processed video data received by the input interface into a predefined set where the predefined set can be a partial picture, a frame or a group of pictures. Pixel intensity clipping 440 is then applied to the predefined set using a range associated with the predefined set of original data. If the intensity of the predefined set the processed data is greater than the maximum value for the predefined set of original data, the intensity of the processed data is clipped to the maximum value for the predefined set of original data. If the intensity of the predefined set of the processed data is smaller than the minimum value for the predefined set of original data, the intensity of the processed data is clipped to the minimum value for the predefined set of original data. The range information associated with the corresponding predefined set of original video data is provided external to processing module 450. FIG. 4A further illustrates an exemplary processing module 400 to provide the needed range information. The range computation is based on the original video data 402 received from input interface 410. The original video data 402 is divided into the predefined set by data configuration 420. Range determination 430 is used to compute the range information associated with the corresponding predefined set of original video data. The computed range information is then provided to pixel intensity clipping 440.

Upon the determination of the range information by the block 430, the range information such as the associated maximum value and minimum value can be provided to pixel intensity clipping 440. In a video procession system, the range information may be transmitted or stored as part of compressed bit stream and will consume some amount of bit rate. In order to conserve the bit rate associated with the range information, additional range data processing 460 is incorporated, as shown in block 400a of FIG. 4B. In one embodiment according to the present invention, the differences between the maximum/minimum values and respective reference maximum/minimum values are used. The reference maximum/minimum vales may correspond to reconstructed maximum/minimum vales, previously decoded maximum/minimum vales, or predefined maximum/minimum values in various embodiments according to the present invention. In yet another embodiment of the present invention, the maximum value and the minimum value may also be selected from a predefined range set indicated by a range index and the range index is included in the range information.

Figure 4B:
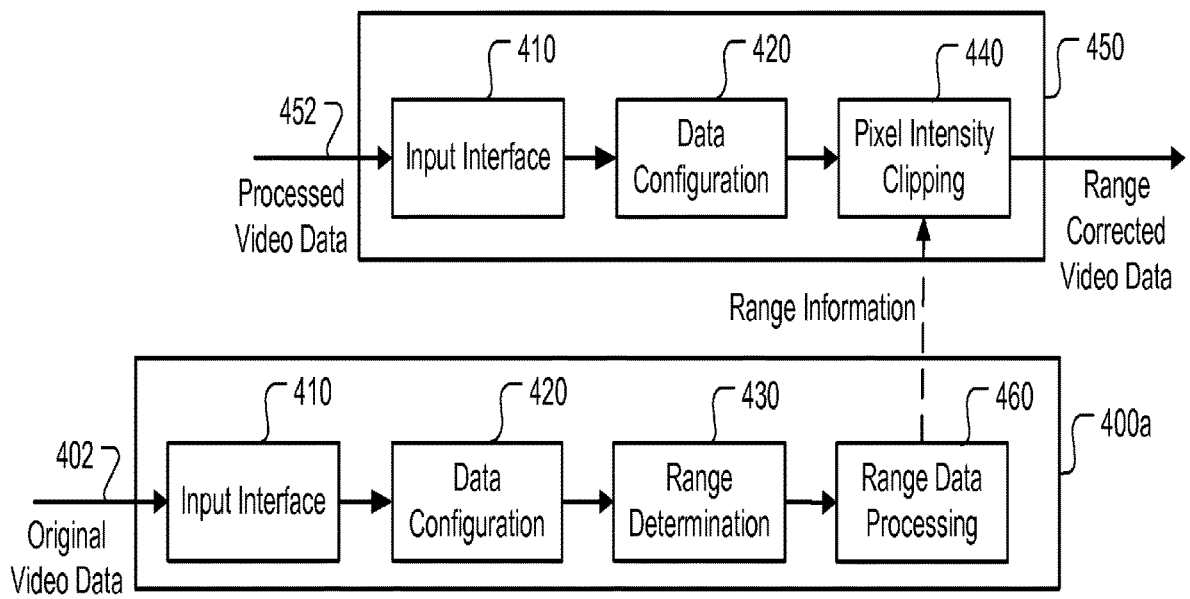
FIG. 4B illustrates another exemplary system block diagram of content-adaptive clipping for a predefined set of video data, where the range information is processed by range data processing.

The system shown in FIG. 4A and FIG. 4B correspond to pixel clipping at the encoder side where the range information is derived locally. At a decoder side, only the module 450 will be present and the range information will be provided by the encoder through a communication method such as using the parameter set in sequence head or picture header, or using the slice header or coding unit header as practiced in various international video coding standards. The range data processing block 460 is responsible for preparing the range information in a proper format and communicating the range information between an encoder and a decoder. Consequently, at the encoder side, the range data processing block 460 will prepare the range information in the form of the maximum/minimum values or difference values associated with the maximum/minimum values and respective reference values as described above. The prepared range information is then properly inserted into the compressed bitstream using a communication protocol, such as the exemplary syntax shown in FIG. 6 and FIG. 7. At a decoder side, the range data processing block 460 will be responsible for retrieving the range information from the compressed bitstream. In the example associated with the syntax of FIG. 6 and FIG. 7, the range data processing block 460 will extract the relevant parameters associated with the range information, recover the range information, and provide the range information to the pixel intensity clipping block 440. While the range data processing block 460 is shown as an individual block to illustrate the required processing and the interfaces, the function or processing can be incorporated into other processing or function modules to save system cost or to make the processing more efficient.

Figure 5A:
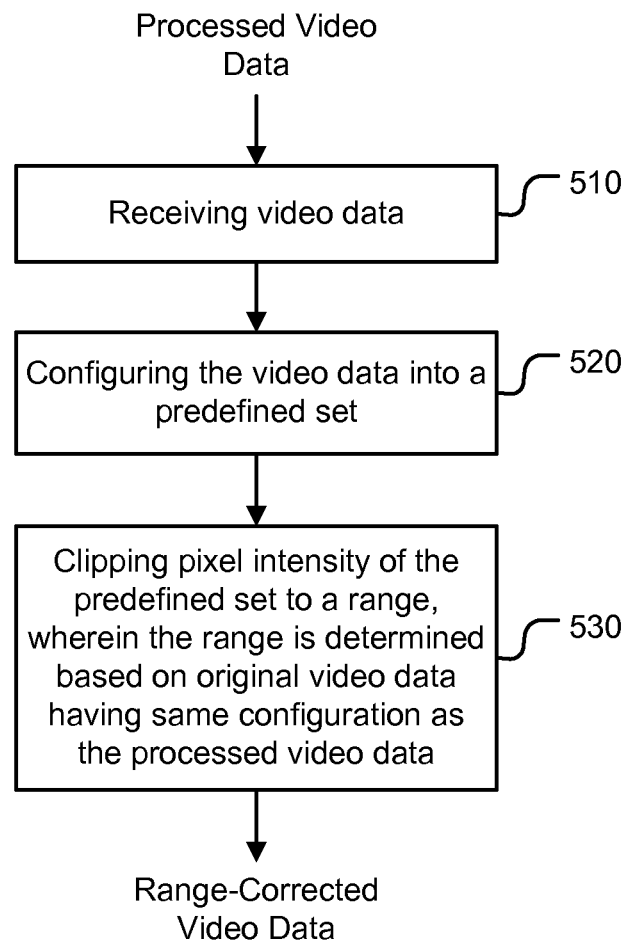
FIG. 5A illustrates an exemplary flow chart of content-adaptive clipping for a predefined set of video data.
Figure 5B:
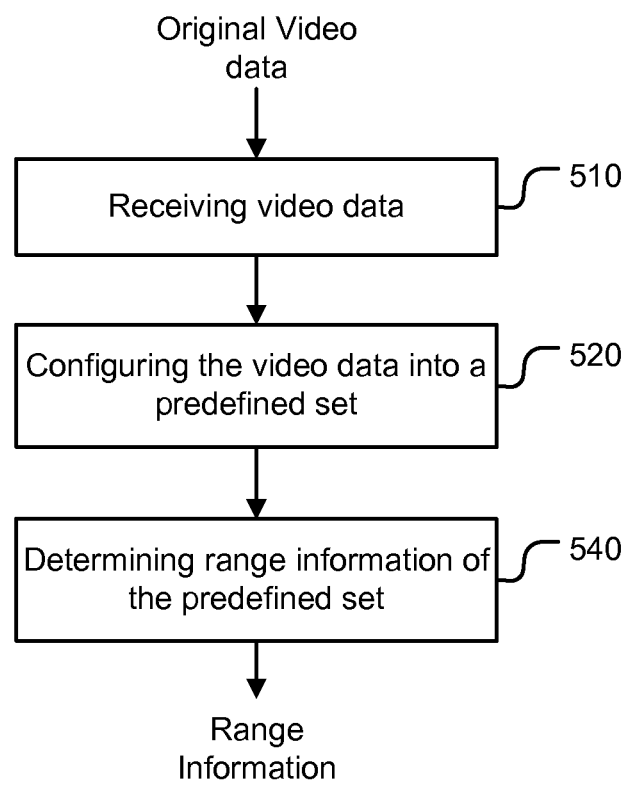
FIG. 5B illustrates an exemplary flow chart for determining the range of a predefined set of video data.

FIG. 5A illustrates an exemplary flow chart of content-adaptive clipping for a predefined set of processed video data according to the present invention. The processed video data is received at step 510 and subsequently the processed video data is configured into a predefined set at step 520. For each predefined set, the processed video data is clipped based on a range associated with the corresponding predefined set of the original video data. An exemplary flow chart of range determination is illustrated in FIG. 5B, where the original video data is used as the input. After a corresponding predefined set is formed, the range for the predefined data is determined at step 540.

In a compression system, the range information can be carried in the Sequence Parameter Set (SPS) or Picture Parameter Set (PPS) as defined in the international video coding standard H.264. Alternatively, the range information may also be carried in the slice header or coding unit header as defined in the H.264 standard. FIG. 6 illustrates an example of carrying the range information in the PPS. The adaptive_clipping_flag is a 1-bit flag to indicate whether the adaptive clipping will be used; a value "1" denotes that adaptive clipping is enabled and a value "0" denotes that adaptive clipping is disabled. When the adaptive_clipping_flag is "1", the adaptive_clipping_slice_level_flag will be further used to indicate whether slice-level adaptive clipping is used; a value "1" denotes that adaptive clipping is enabled and a value "0" denotes that adaptive clipping is disabled at the slice level. Accordingly, the adaptive_clipping_slice_level_flag will be used in the slice header as shown in FIG. 6. The PPS further comprises an adaptive_clipping_broadcast_legal_flag to indicate whether the range complies with the BT-656 standard; a value "1" denotes compliance and a value "0" denotes non-compliance. According to the BT-656 standard for 8-bit video data, the range for the Y component is from 16 to 235 and the range for Cr (also referred to as V) and Cb (also referred to as U) is from 16 to 240. The actual value for U and V is derived by subtracting 128 from the above positive integer representation. If the range is not in compliance with the BT-656 standard, as indicated by a value "0", the range information has to be supplied. Accordingly, adaptive_clipping_minY is provided for the minimal Y value and adaptive_clipping_limitY_minus_maxY is provided for difference between the largest value corresponding to integer representation and the maximum Y value. For example, in the BT-656 standard, the largest value for 8-bit integer representation is 255 and the maximum Y value is 235. Therefore a value of 20 would be used by adaptive_clipping_limitY_minus_maxY. Similarly, adaptive_clipping_minU and adaptive_clipping_limitU_minus_maxU are provided to indicate the range for the U component. Very often, the U and V components have the same range and a flag adaptive_clipping_sameUV_data_flag can be used to indicate such case; a value "1" denotes the same UV range and a value "0" denotes different UV ranges. When UV components have different range, separate range information for the V component, i.e., adaptive_clipping_minV and adaptive_clipping_limitV_minus_maxV have to be provided.

FIG. 7 illustrates an example of carrying range information in the slice header. Since the slice corresponds to a smaller picture unit and the bit rate overhead for the range information may be more significant. In order to conserve the bit rate associated with the range information, differential data is used to carry the range information. adaptive_clipping_use_slice_delta_flag represents the range information remains the same as those of previous frame. adaptive_clipping_minY_slice_delta represents the difference between the minimum Y value and a reference minimum Y value associated with the slice. As mentioned before, the reference value may correspond to the reconstructed value, previously decoded value, or predefined maximum/minimum value. Similarly, adaptive_clipping_maxY_slice_delta, adaptive_clipping_minU_slice_delta, and adaptive_clipping_maxU_slice_delta are used for differential maximum Y value, minimum U value and maximum U value respectively. Again, U and V components often have the same range and the case is indicated by adaptive_clipping_sameUV_data_flag. In this case, adaptive_clipping_minV_slice_delta and adaptive_clipping_maxV_slice_delta have the same values as adaptive_clipping_minU_slice_delta and adaptive_clipping_maxU_slice_delta respectively. Otherwise, separate values for the V component will be provided. Syntaxes in FIG. 6 and FIG. 7 illustrate an example of carrying range information in the compressed bit stream and they are not limitations to the invention. Other syntaxes and semantics may be used to fulfill the purpose of carrying range information in the compressed bitstream.

The system block diagram 300 of FIG. 3 can also be used for offset restoration. As described previously, the reconstructed video data 152 may be subject to offset problem and the content-adaptive pixel-intensity processing 310 can be utilized to correct the offset problem. While content-adaptive pixel-intensity processing 310 is shown as a module separate from the reconstruction block 150, steps or processing of content-adaptive pixel-intensity processing 310 may be interleaved or combined with steps and processing of the reconstruction block 150. There is a tradeoff between the potential performance improvement and the increase of overhear information associated with smaller picture areas. Accordingly, the pixel intensity processing disclosed in this disclosure utilizes a predefined partial picture, called a predefined set, in this disclosure. The size of predefined set can be independent of the picture area used for respective system processing such as video compression or sensor image processing.

Figure 8A:
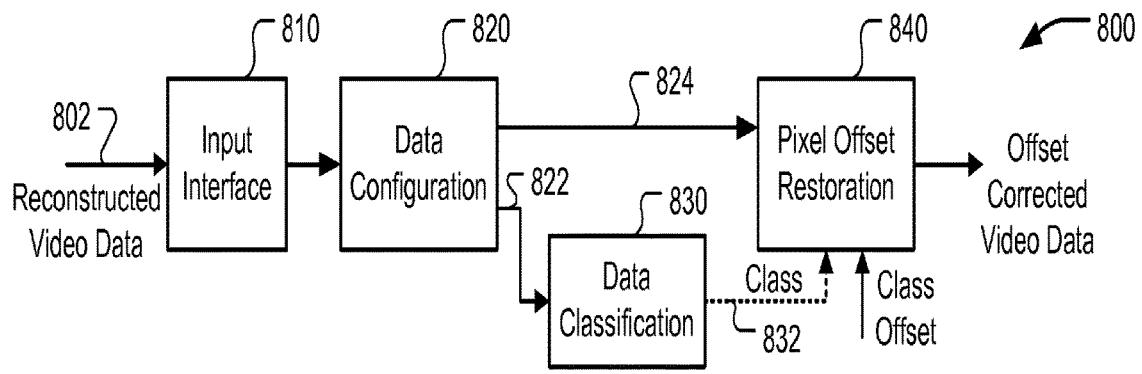
FIG. 8A illustrates an exemplary system block diagram of offset restoration according to one embodiment of the present invention.

FIG. 8A illustrates an exemplary implementation 800 of the content-adaptive pixel-intensity offset restoration according to the present invention. Input interface 810 is used to receive incoming processed video data 802 where the incoming data may be video data processed by deblocking, loop filter, prediction, interpolation, reconstruction, spatial filtering, temporal filtering, noise reduction, restoration, and sensor image processing. The incoming data may also represent video data processed by a combination of the above processing. The data configuration block 820 configures the video data into a predefined set where the predefined set can be a partial picture such as a macroblock, a group of macroblocks, a slice, a stripe, a picture region, a field, a frame, or a group of pictures. The predefine set can be fixed for the whole video data or can be varied adaptively according to a performance criterion. For example, parts of a frame may use a stripe as the predefined set and other parts may use a cluster of macroblocks as the predefined set, or multiple frames may be configured into a predefined set. The decision for the predefined set selection may be determined according to a performance criterion, such as Peak Signal-to-Noise Ratio (PSNR), bit rate, or rate-distortion function. The video data in each predefined set is processed by the data classification block 830 to determine a class according to content information. The class 832 is used to control pixel offset restoration 840 of pixels 824 of the predefined set. The offset information is provided to the pixel offset restoration block 840. Both the class and the class offset are utilized by the offset restoration block 840 to correct the offset of pixels of the predefined set.

Figure 8B:
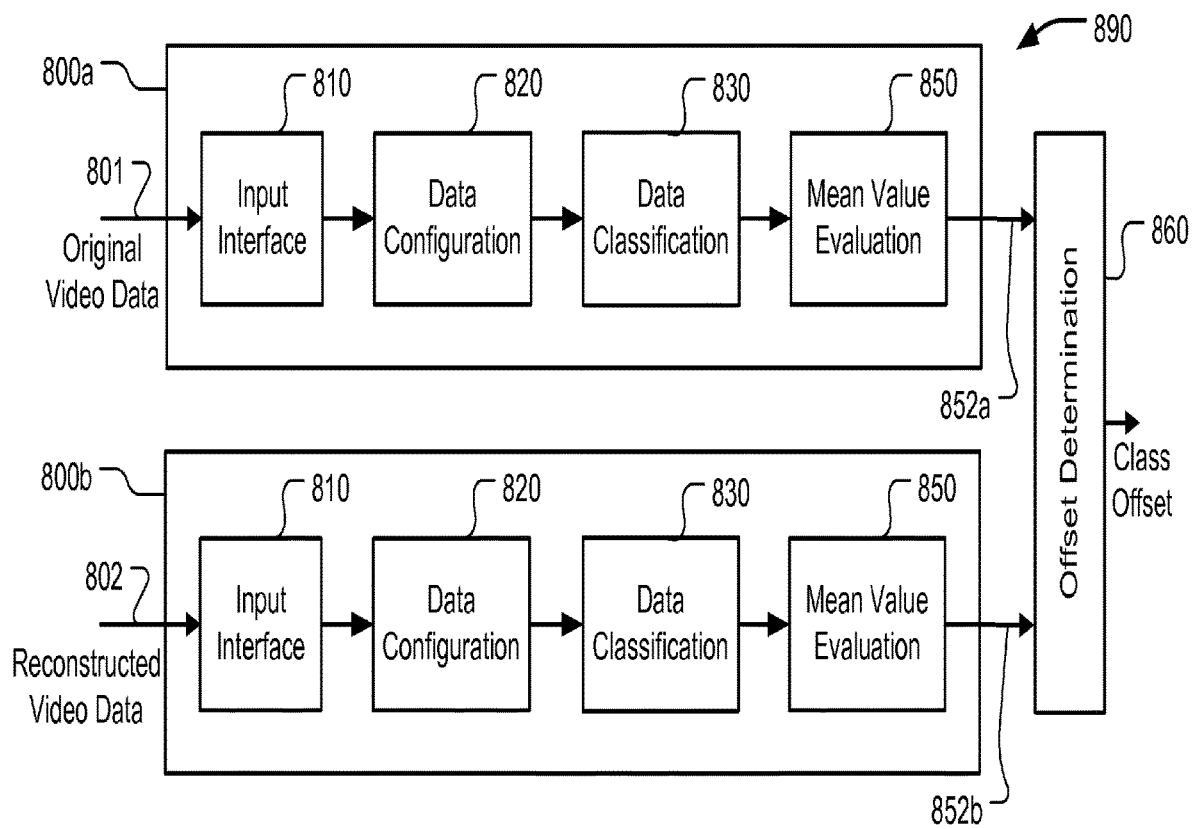
FIG. 8B illustrates an exemplary block diagram of computing offset associated with a class of the predefined set according to one embodiment of the present invention.
Figure 8C:
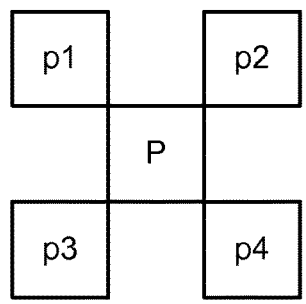
FIG. 8C illustrates an alternative neighboring-pixels configuration for edge characteristic detection used in one embodiment of the present invention.

The content information used for data classification 830 may consist of a current pixel and four surrounding pixels, such as the configuration shown in FIG. 8B. Other configuration may also be used such as the upper left, upper right, lower left and lower right pixels as shown in FIG. 8C. The neighbor set of FIG. 8C is configured to be more responsible to slanted edges at 45° and −45° while the neighbor set of FIG. 8B is configured to be more responsible to horizontal and vertical edges. The selection of the neighbor set may also be performed adaptively.

Pixel intensity can also be used as the content information to classify the underling pixel into a class. For example, the most significant n bits of an 8-bit data may be used as the index for a class or a band. This is equivalent to use a uniform quantizer having a step size of 2n to divide the 8-bit intensity into 2n classes. However, the histogram for most image data has a non-uniform distribution and a non-uniform quantizer may characterize the underlying data better. The design of a non-uniform quantizer to match underlying data with a specified probability density function is well known in the art and will not be described here. The use of uniform or non-uniform quantizer can be selected adaptively and information regarding the quantizer type or interval type can be transmitted to the decoder side in the video compression application. The interval type information may also be derived at the decoder side based on certain priori information. For example, if a uniform quantizer is used, the number of pixels in each class will vary roughly according to the histogram. On the other hand, a well designed non-uniform quantizer will result in roughly equal number of pixels in all classes.

As shown in FIG. 8A, pixel offset restoration 840 needs the class for the underlying pixel being restored and the offset associated with the class. While the class of the underlying pixel can be determined by data classification 830, the class offset may have to be provided by others since the pixel offset restoration unit 800 may not have access to the original data. FIG. 8B illustrates an exemplary implementation of class offset computation 890 according to the present invention. The mean intensity value Vr(k) for reconstructed pixels in the predefined set belonging to a class k can be computed from the reconstructed pixels in the predefined set belonging to the class k, as shown in block 800b. The reconstructed video data 802 is received through input interface 810 and configured into a predefined set by data configuration 820. Pixels of reconstructed video data in the predefined set are then classified into classes by data classification 830. Mean value for each class is then computed by mean value evaluation 850 to generate the reconstructed mean value 852b. Similarly, the mean intensity value Vo(k) 852a for original pixels in the predefined set belonging to the class k can be computed by block 800a. In FIG. 8A and FIG. 8B, the reconstructed video data is used as an example of processed video data to be restored to correct offset problem. Other types of processed video data having the offset problem may also be restored by the system shown in FIG. 8A and FIG. 8B. The offset Vd(k) associated with the predefined set for the class k can be determined by offset determination 860 according to:

$$Vd(k) = Vo(k) - Vr(k).$$

To restore an offset, the offset Vd(k) as computed above is added to all pixels in the predefined set belonging to class k. As shown above, the mean intensity value Vo(k) for an original video data will be required to perform the computation. While the original video data is not shown explicitly in FIG. 3, it is understood that the original video data will be made available for the mean computation. Alternatively, the mean intensity value Vo(k) may be computed by other part of the system, not shown in FIG. 8B, and be provided to the offset determination 860 for computing the offset associated with the predefined set for the class k. The offset information will be transmitted to a decoder for restoration if it is used in a video compression system.

Figure 9:
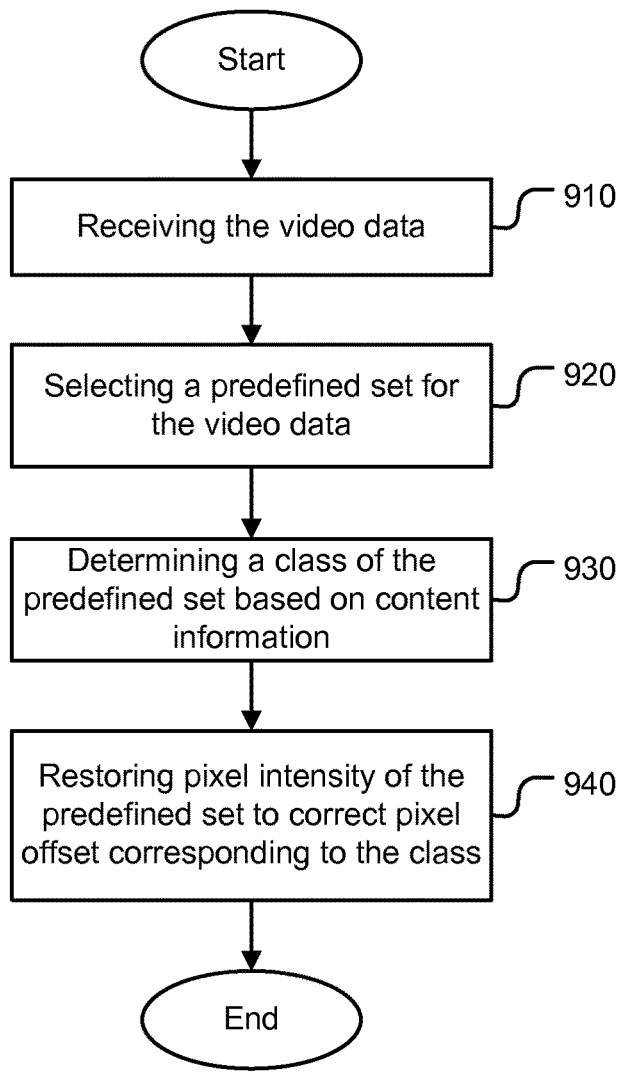
FIG. 9 illustrates an exemplary flow chart of content-adaptive offset restoration for a class of predefined set of video data.

FIG. 9 illustrates an exemplary flow chart for content-adaptive offset restoration of a predefined set of video data according to the present invention. The processed video data is received at step 910 and the video data is configured into a predefined set at step 920. For each pixel in the predefined set, a class based on content information is determined in step 930 for the underlying pixel of the predefined set. The pixel offset is restored using a class offset for the predefined set in step 940. The class offset is derived according to a difference between a first mean value computed for the class of the original video data and a second mean value computed for the class of the processed video data of the predefined set.

Embodiment of content-adaptive pixel intensity clipping and offset restoration according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software codes or firmware codes may be developed in different programming languages and different format or style. The software codes may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for processing video data, the method comprising:

receiving input data associated with processed video data;

configuring the processed video data into a plurality of predefined sets;

deriving a first maximum value and a first minimum value for a first predefined set from a first range information incorporated in a first portion of a bitstream, wherein the first range information is represented by one or more syntax elements indicating the first maximum value and the first minimum value, one or more syntax elements indicating prediction values of the first maximum value and the first minimum value, or one or more syntax elements indicating a predefined range set defining the first maximum value and the first minimum value;

deriving a second maximum value and a second minimum value for a second predefined set from a second range information incorporated in a second portion of the bitstream, wherein the second range information is represented by one or more syntax elements indicating the second maximum value and the second minimum value, one or more syntax elements indicating prediction values of the second maximum value and the second minimum value, or one or more syntax elements indicating a predefined range set defining the second maximum value and the second minimum value; and decoding each predefined set by its own clipping range, comprising:

processing the first predefined set to not exceed the first maximum value and the first minimum value; and processing the second predefined set to not exceed the second maximum value and second the minimum value, wherein the first portion and the second portion are different portions of the bitstream, wherein processing the first predefined set is independent of the second maximum value and second the minimum value, and wherein processing the second predefined set is independent of the first maximum value and first the minimum value.

2. The method of claim 1, wherein for a maximum value and a minimum value corresponding to either the first maximum value or the second maximum value and the first minimum value and the second minimum value, wherein the prediction values of the maximum value and the minimum value are determined based on a reference maximum value and a reference minimum value corresponding to: a reconstructed maximum value and a reconstructed minimum value, a previously coded maximum value and a previously coded minimum value, a predefined maximum value and a predefined minimum value, or a signaled maximum value and a signaled minimum value indicated in Sequence Parameter Set (SPS) or Picture Parameter Set (PPS).

3. The method of claim 2, wherein the prediction values comprise a first difference associated with an original maximum value and the reconstructed maximum value and a second difference associated with an original minimum value and the reconstructed minimum value, wherein the original maximum value and the original minimum value are for a predefined set of original video data, and the predefined set of reconstructed video data is derived from the predefined set of original video data.

4. The method of claim 2, wherein the prediction values comprise a first difference associated with an original maximum value and the previously coded maximum value and a second difference associated with an original minimum value and the previously coded minimum value, wherein the original maximum value and the original minimum value are for a predefined set of original video data corresponding to either the first predefined set or the second predefined set, and the predefined set of reconstructed video data is derived from the predefined set of original video data.

5. The method of claim 2, wherein the prediction values comprise a first difference associated with an original maximum value and the predefined maximum value and a second difference associated with an original minimum value and the predefined minimum value, wherein the original maximum value and the original minimum value are for a predefined set of original video data corresponding to either the first predefined set or the second predefined set, and the predefined set of reconstructed video data is derived from the predefined set of original video data.

6. The method of claim 2, wherein the prediction values comprise a first difference associated with an original maximum value and the signaled maximum value indicated in the SPS or the PPS and a second difference associated with an original minimum value and the signaled minimum value indicated in the SPS or the PPS, wherein the original maximum value and the original minimum value are for a predefined set of original video data corresponding to either the first predefined set or the second predefined set, and the predefined set of reconstructed video data is derived from the predefined set of original video data.

7. The method of claim 1, wherein a predefined set of processed video data corresponding to either the first predefined set or the second predefined set corresponds to a picture structure selected from a group consisting of a macroblock, a group of macroblocks, a stripe, a slice, a sub-picture, a picture region, a frame and a group of pictures.

8. The method of claim 7, wherein the picture structure is fixedly defined or adaptively selected according to a performance criterion.

9. The method of claim 1, wherein said one or more syntax elements representing range information corresponding to either the first range information or the second range information is incorporated in one or a combination of Sequence Parameter Set (SPS), Picture Parameter Set (PPS), slice header, or coding unit header.

10. The method of claim 1, wherein range information corresponding to either the first range information or the second range information comprises range information for a luma component and range information for two chroma components.

11. The method of claim 1, wherein range information corresponding to either the first range information or the second range information comprises range information for a luma component, range information for a first chroma component and range information for a second chroma component.

12. The method of claim 11, wherein the first chroma component and the second chroma component correspond to U component and V component, or Cb component and Cr component.

13. The method of claim 1, wherein the range information corresponding to either the first range information or the second range information for the respective first or second predefined set of processed video data remains the same as previous range information indicated by a flag.

14. The method of claim 1, wherein the processed video data corresponds to a video signal processed by one or a combination of processing selected from a group consisting of prediction, interpolation, reconstruction, de-blocking, spatial filtering, temporal filtering, noise reduction, restoration, and sensor image processing.

15. An apparatus for processing video data, the apparatus comprising one or more electronic circuits configured to:
receive input data associated with processed video data;
configure the processed video data into a plurality of predefined sets;
derive first maximum value and a first minimum value for a first predefined set from a first range information incorporated in a first portion of a bitstream, wherein the first range information is represented by one or more syntax elements indicating the first maximum value and the first minimum value, one or more syntax elements indicating prediction values of the first maximum value and the first minimum value, or one or more syntax elements indicating a predefined range set defining the first maximum value and the first minimum value;
derive a second maximum value and a second minimum value for a second predefined set from a second range information incorporated in a second portion of the bitstream, wherein the second range information is represented by one or more syntax elements indicating the second maximum value and the second minimum value, one or more syntax elements indicating prediction values of the second maximum value and the second minimum value, or one or more syntax elements indicating a predefined range set defining the second maximum value and the second minimum value; and
decode each predefined set by its own clipping range, comprising:
process the first predefined set to not exceed the first maximum value and the first minimum value; and
process the second predefined set to not exceed the second maximum value and second the minimum value,
wherein the first portion and the second portion are different portions of the bitstream,
wherein processing the first predefined set is independent of the second maximum value and second the minimum value, and
wherein processing the second predefined set is independent of the first maximum value and first the minimum value.

* * * * *